United States Patent
Thermond et al.

(10) Patent No.: US 7,372,828 B2
(45) Date of Patent: May 13, 2008

(54) WIRELESS ACCESS POINT MANAGEMENT IN A CAMPUS ENVIRONMENT

(75) Inventors: Jeffrey L. Thermond, Saratoga, CA (US); Richard G. Martin, Morgan Hill, CA (US)

(73) Assignee: Broadcom Corporation, Irvine, CA (US)

( * ) Notice: Subject to any disclaimer, the term of this patent is extended or adjusted under 35 U.S.C. 154(b) by 1304 days.

(21) Appl. No.: 10/271,967

(22) Filed: Oct. 15, 2002

(65) Prior Publication Data

US 2003/0117973 A1 Jun. 26, 2003

Related U.S. Application Data

(60) Provisional application No. 60/342,684, filed on Dec. 21, 2001.

(51) Int. Cl.
*H04Q 7/00* (2006.01)
*H04Q 7/20* (2006.01)
*H04L 11/00* (2006.01)

(52) U.S. Cl. .................. 370/328; 455/426.2; 455/465; 370/357

(58) Field of Classification Search ............ 455/426.1, 455/426.2, 465; 370/351, 328, 357
See application file for complete search history.

(56) References Cited

U.S. PATENT DOCUMENTS

| | | | |
|---|---|---|---|
| 5,790,536 A * | 8/1998 | Mahany et al. | 370/338 |
| 6,659,947 B1 * | 12/2003 | Carter et al. | 600/300 |
| 6,970,434 B1 * | 11/2005 | Mahany et al. | 370/256 |
| 2002/0069334 A1 * | 6/2002 | Hsia et al. | 711/147 |
| 2002/0075844 A1 * | 6/2002 | Hagen | 370/351 |

* cited by examiner

*Primary Examiner*—Tilahun Gesesse
(74) *Attorney, Agent, or Firm*—Garlick Harrison & Markison; Bruce E. Garlick; Holly L. Rudnick

(57) ABSTRACT

A Wireless Local Area Network (WLAN) is operated in conjunction with a wired Local Area Network (wired LAN) to service a premises, e.g., a campus setting. The wired LAN services the wired communication needs of the premises and serves as the wired backbone of the WLAN. A plurality of Wireless Access Points (WAPs) of the WLAN couple to the wired backbone and are serviced by the LAN. With this shared structure, wired network components, e.g., multi-layer switches, manage the operation of WLAN components, i.e., WAPs. Such management includes ensuring that the WAPs provide sufficient bandwidth to support wireless packetized voice communications. Additional management operations include WAP access, wireless terminal registration, and channel resource allocation, among others.

32 Claims, 10 Drawing Sheets

WIRELESS ACCESS POINT MANAGEMENT IN A CAMPUS ENVIRONMENT

CROSS REFERENCE TO RELATED APPLICATION

This application claims priority to U.S. Provisional Patent Application Ser. No. 60/342,684, filed Dec. 21, 2001, which is incorporated herein by reference.

1. FIELD OF THE INVENTION

This invention relates generally to the merging of wired and wireless local area networks; and more particularly to the management of wireless local area network components within a merged network.

2. BACKGROUND OF THE INVENTION

Communication technologies that link electronic devices in a networked fashion are well known. Examples of communication networks include wired packet data networks, wireless packet data networks, wired telephone networks, wireless telephone networks, and satellite communication networks, among other networks. These communication networks typically include a network infrastructure that services a plurality of client devices. The Public Switched Telephone Network (PSTN) is probably the best-known communication network that has been in existence for many years. The Internet is another well-known example of a communication network that has also been in existence for a number of years. These communication networks enable client devices to communicate with one another other on a global basis. Wired Local Area Networks (wired LANs), e.g., Ethernets, are also quite common and support communications between networked computers and other devices within a serviced area. Wired LANs also often link serviced devices to Wide Area Networks and the Internet. Each of these networks is generally considered a "wired" network, even though some of these networks, e.g., the PSTN, may include some transmission paths that are serviced by wireless links.

Wireless networks have been in existence for a relatively shorter period. Cellular telephone networks, wireless LANs (WLANs), and satellite communication networks, among others, are examples of wireless networks. Relatively common forms of WLANs are IEEE 802.11(a) networks, IEEE 802.11(b) networks, and IEEE 802.11(g) networks, referred to jointly as "IEEE 802.11 networks." In a typical IEEE 802.11 network, a wired backbone couples to a plurality of Wireless Access Points (WAPs), each of which supports wireless communications with computers and other wireless terminals that include compatible wireless interfaces within a serviced area. The wired backbone couples the WAPs of the IEEE 802.11 network to other networks, both wired and wireless, and allows serviced wireless terminals to communicate with devices external to the IEEE 802.11 network.

WLANs provide significant advantages when servicing portable devices such as portable computers, portable data terminals, and other devices that are not typically stationary and able to access a wired LAN connection. However, WLANs provide relatively low data rate service as compared to wired LANs, e.g., IEEE 802.3 networks. Currently deployed wired LANs provide up to one Gigabit/second bandwidth and relatively soon, wired LANs will provide up to 10 Gigabit/second bandwidths. However, because of their advantages in servicing portable devices, WLANs are often deployed so that they support wireless communications in a service area that overlays with the service area of a wired LAN. In such installations, devices that are primarily stationary, e.g., desktop computers, couple to the wired LAN while devices that are primarily mobile, e.g., laptop computers, couple to the WLAN. The laptop computer, however, may also have a wired LAN connection that it uses when docked to obtain relatively higher bandwidth service.

Other devices may also use the WLAN to service their communication needs. One such device is a WLAN phone, e.g., an IEEE 802.11 phone that uses the WLAN to service its voice communications. The WLAN communicatively couples the IEEE 802.11 phone to other phones across the PSTN, other phones across the Internet, other IEEE 802.11 phones, and/or to other phones via various communication paths. IEEE 802.11 phones provide excellent voice quality and may be used in all areas serviced by the WLAN.

Significant problems exist, however, when using a WLAN to support voice communications. Because the WLAN services both voice and data communications, the WLAN may not have sufficient capacity to satisfy the low-latency requirements of the voice communication. These capacity limitations are oftentimes exacerbated by channel limitations imposed in many IEEE 802.11 installations. Further, roaming within a WLAN (between WAPs) can introduce significant gaps in service, such gaps in service violating the low-latency requirements of the voice communication.

Additional significant shortcomings relate to the traditional deployment of the WLANs themselves. A traditional WLAN installation includes a wired backbone and a plurality of WAPs that couple to the wired backbone. Each of the WAPs requires management to ensure that it adequately services its own load and so that it does not unduly interfere with the operation of its neighboring WAPs. The management of a WLAN is therefore additive to the management of a wired LAN and, in most installations, is more difficult. Typically, for a particular serviced premises, e.g., campus setting, a single edge router services both the wired LAN and the WLAN in providing access to the Internet, to a Wide Area Network, etc. Thus, even though the wired LAN and the WLAN service the same premises and couple to the outside world via the same edge router, completely separate infrastructures are required to service each.

When a WLAN services a premises according to a standardized communication protocol, e.g., IEEE 802.11(a), IEEE 802.11(b), IEEE 802.11(g), etc., visitors are able to access the WLAN. However, the WLAN provides access to confidential and proprietary resources in most campuses. Thus, security access operations are typically installed to prevent unauthorized access to the WLAN. When the premises are open to visitors, the visitors would like to wirelessly access their email, to access the Internet, and to access their respective WANs. Many buildings that make up the premises are constructed so that they partially (or fully) shield cellular Radio Frequency (RF) transmissions. Thus, visiting wireless devices, even if they support cellular data service, they can oftentimes not access their servicing cellular network at acceptable data rates.

Thus, there is a need in the art for improvements in the operation and management of WLANs, particularly when the WLANs are installed additionally to wired LANs.

SUMMARY OF THE INVENTION

In order to overcome the above-cited shortcomings of the prior WLANs, among other shortcomings, a Wireless Local Area Network (WLAN) is operated in conjunction with a wired Local Area Network (wired LAN) to service a premises, e.g., a campus setting. With a system constructed according to the present invention, a wired LAN services the wired communication needs of the premises and serves as the wired backbone of a WLAN. A plurality of Wireless Access Points (WAPs) couple to the wired backbone of the wired LAN and are serviced by the wired LAN switch(es) coupled thereto. The wired LAN switch(es) that manage the WAPs may be campus core routers, building/floor routers, or other wired LAN switches. The wired LAN switch(es) that operate according to the present invention to manage the WAPs perform operations at protocol layers two through seven and are generally referred to as "multi-layer switches". The multi-layer switches may also be referred to as Layer 7 switches, switch routers, Layer 2+ switches, etc.

According to the present invention, the operation of a plurality of WAPs of the WLAN are managed by one or more multi-layer switches of the wired LAN to ensure that the WAPs provide sufficient bandwidth to service voice terminals, e.g., IEEE 802.11 phones, VOIP terminals, etc. According to one embodiment of these operations, the multi-layer switch downloads the identities of serviced voice terminals to the plurality of WAPs. In servicing communications, the WAPs recognize wireless terminals as voice terminals based upon their unique addresses/identifiers, e.g., wired LAN address. For wireless terminals that service only voice communications or for devices that have a unique address/identifier for voice service, this technique works fine. However, many devices service both voice communications and data communications.

Thus, according to another technique of the present invention, a high processing capacity multi-layer switch looks at the contents of serviced data packets to determine whether the communication is a voice communication. For example, layer 3 IP data packets carrying a voice communication may include an IP Precedence, DiffServ Code Point (DSCP), or 802.1p Class of Service field to indicate that the IP packet carries a voice communication. The multi-layer switch will look at the contents of the IP packet using this technique to determine whether the communication is a voice communication. However, wireless terminals may falsely indicate that a serviced packet data communication is a voice communication. Thus, according to another aspect of the present invention, the multi-layer investigates not only Layer 3 indications (which may falsely indicated Type of Service (ToS) as voice service) but must also investigate the Layer 4 socket number of the communication to determine whether the voice/data terminal is a voice communication. Nonetheless, some serviced wireless terminals may claim a voice Layer 4 TCP/UDP port number even though the communication is not a voice communication.

Thus, according to another operation of the present invention, communication characteristics are monitored by the multi-layer switch. For example, if the terminal has a sustained bandwidth usage of 64 Kbps or less, with substantially constant bandwidth usage, the communication is most likely a voice communication. Conversely, if the communication requires a large instantaneous bandwidth, e.g., 6 Mbps, and/or the communication is bursty, the communication is probably a data communication and not a voice communication. According to the present invention, a high processing capacity multi-layer switch monitors all communications and, based upon the characteristics of the communication, determines whether the communication is a voice communication.

Upon recognition of the terminal as a voice terminal servicing a voice communication, the multi-layer switch interacts with the WAP to assign a Class of Service (CoS) to the voice communication that is sufficient to service the voice communication, e.g., CoS 5, as compared to the CoS that is assigned to data terminals, e.g., CoS 2. Such interaction directs the WAP to provide this CoS for the duration of the ongoing voice communication. However, upon termination of the voice communication, the serviced terminal will be provided with a default CoS, e.g., 2.

Other features and advantages of the present invention will become apparent from the following detailed description of the invention made with reference to the accompanying drawings.

BRIEF DESCRIPTION OF THE DRAWINGS

These and other features, aspects and advantages of the present invention will be more fully understood when considered with respect to the following detailed description, appended claims and accompanying drawings wherein:

DETAILED DESCRIPTION OF THE DRAWINGS

Figure 1:
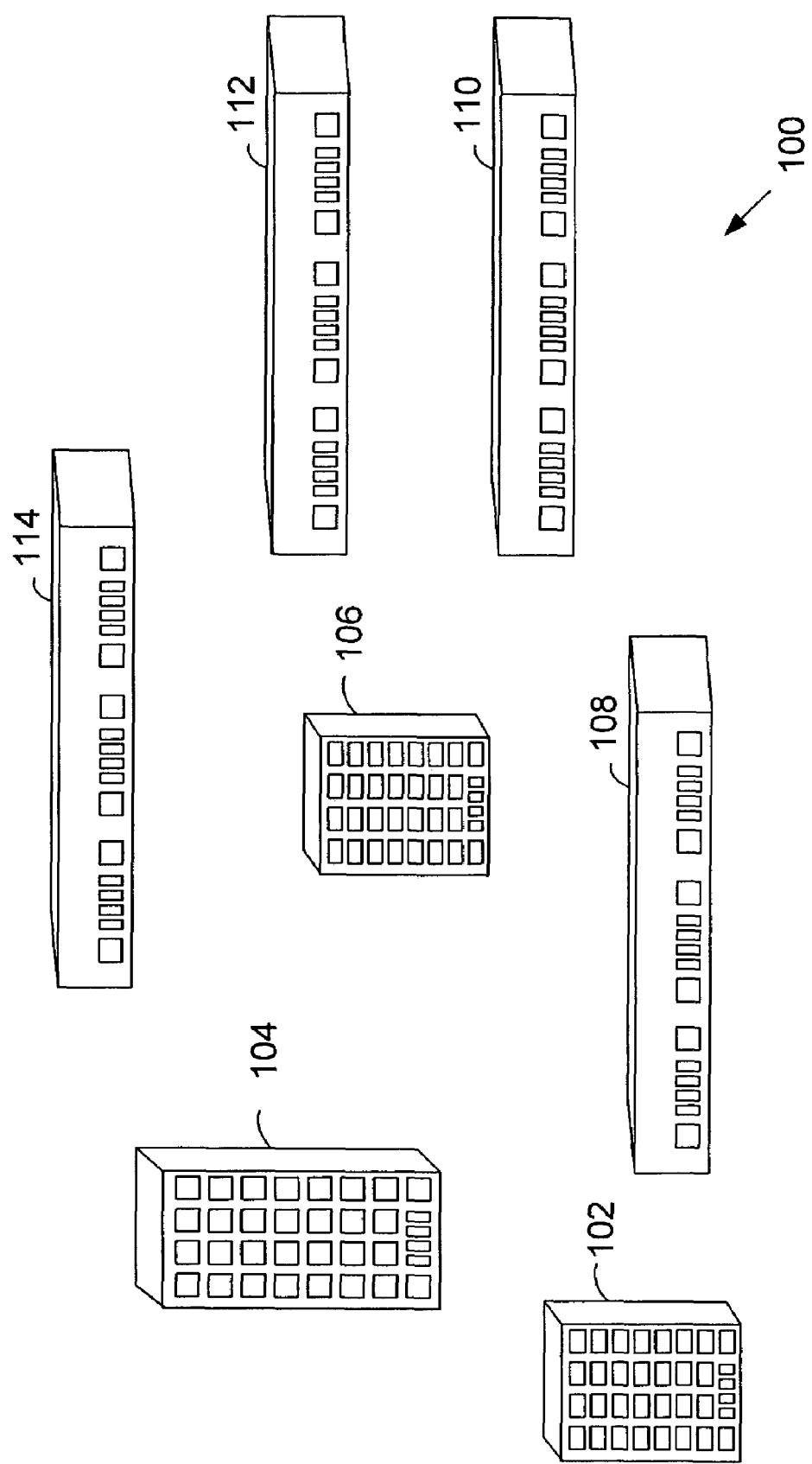
FIG. 1 is a system diagram illustrating a premises in which a network constructed according to the present invention is deployed.

FIG. 1 is a system diagram illustrating a premises 100 in which a network constructed according to the present invention is deployed. The premises 100 (campus) includes office buildings 102, 104, 106 and industrial buildings 108, 110, 112, and 114. The premises 100 may correspond to a company such as a technology company, a seller of goods, a service company, or another type of company. Contained within each of the office buildings 102, 104, and 106 are a number of offices, each of which provides a working space for at least one person. Each of the industrial buildings 108, 110, 112, and 114 provides space for manufacturing, storage, or another purpose. People also work within industrial buildings 108, 110, 112, and 114.

Contained within each of these buildings 102-114 are computer workstations, computer servers, printers, FAX machines, phones, and other electronic devices. Each of these electronic devices has its communication requirements. For example, computer workstations, computer servers, and printers each require data communication service. Such data communication service requires that the devices can communicate with other devices located within the premises 100 and with devices located external to the premises100 across one or more data networks. The FAX machines and phones require coupling to one another and to the Public Switched Telephone Network (PSTN).

According to the present invention, both wired and wireless communications are supported within the premises 100 via a network that provides both wired Local Area Network (wired LAN) and Wireless Local Area Network (WLAN) functionality. The manner in which the network is constructed and the manner in which the wired LAN and WLAN functionality are provided are described further with reference to FIGS. 2 through 10.

Figure 2:
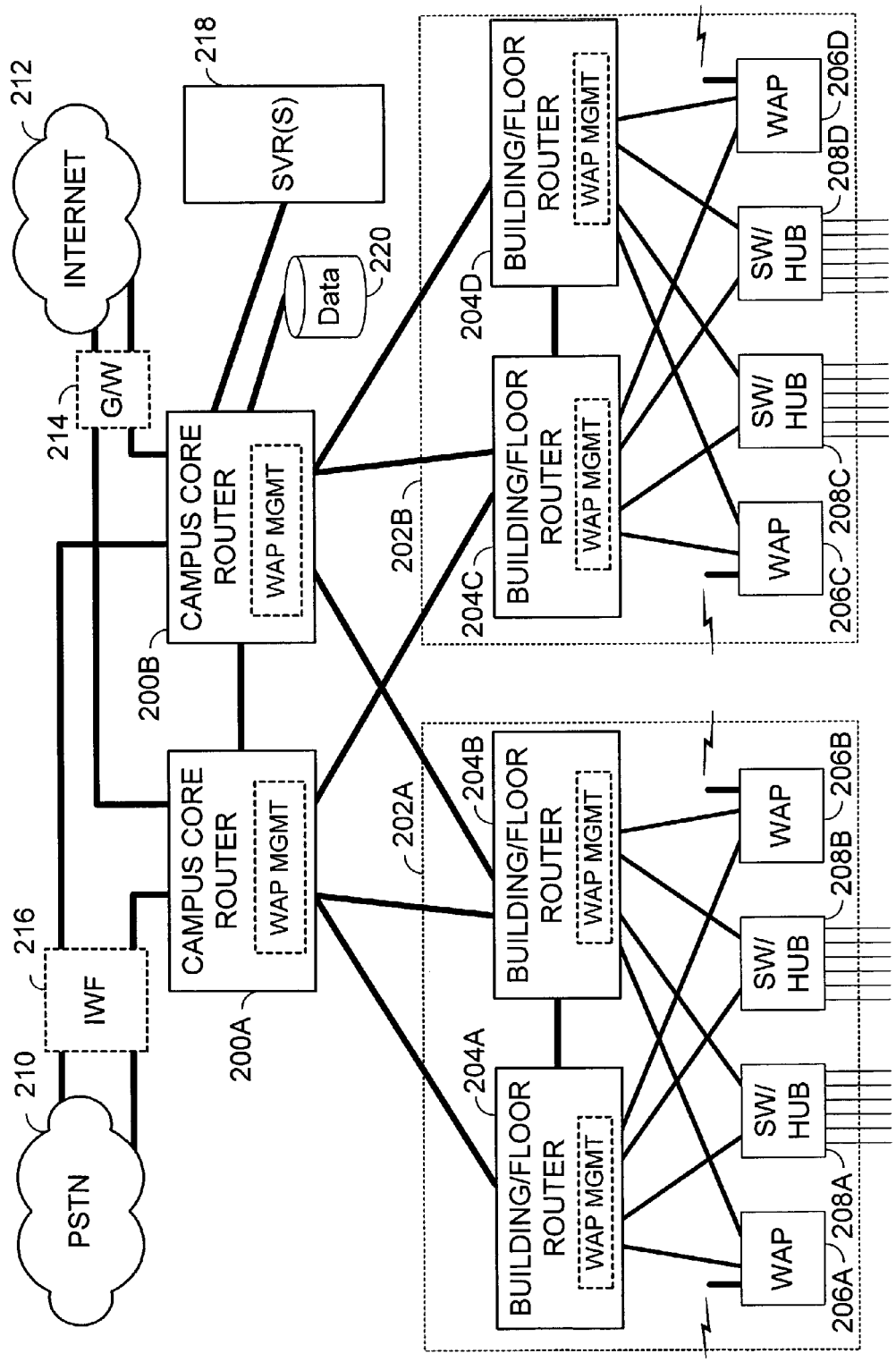
FIG. 2 is a system diagram illustrating a premises based network constructed according to the present invention that supports both wired local area network and wireless local area network operations.

FIG. 2 is a system diagram illustrating a premises based network constructed according to the present invention that supports both wired LAN and WLAN operations. Illustrated in FIG. 2 are some of the components of the network infrastructure that support the premises 100 of FIG. 1. The network includes a pair of campus core routers 200A and 200B that redundantly service the premises 100. Both of the campus core routers 200A and 200B couple to the PSTN 210, via an Inter Working Function "IWF" in some embodiments. Both of the campus core routers 200A and 200B also couple to the Internet 212, via a Gateway or Firewall 214 in some embodiments. As is generally known, the PSTN 210 services conventional voice communications but may also service packet data communications, e.g., Digital Subscriber Lines, etc. The Internet 212 services most packet data communications for the premises 100 and may service Internet Protocol (IP) telephony as well. As should be appreciated by the reader, the campus core routers 200A and 200B may couple to other networks across the Internet 212 or via dedicated network connections.

Each building serviced by the network includes its own building network infrastructure. Each building network infrastructure includes components contained within dotted lines 202A and 202B, for example. Each of the office buildings 102, 104, and 106 shown in FIG. 1 includes a building network infrastructure. The building network infrastructure 202A includes building/floor routers 204A and 204B that service a plurality of wired network switches/hubs 208A and 208B and a plurality of Wireless Access Points (WAPs) 206A and 206B. The communication links between the building/floor routers 204A and 204B and the campus core routers 200A and 200B are typically at a relatively high data rate, e.g., 1000 Mbps. The communication links between the building/floor routers 204A and 204B and the WAPs 206A and 206B and the switches/hubs 208A and 208B are also typically at the relatively high data. However, client connections to the switches/hubs 208A and 208B are typically at a relatively lower data rate, e.g., 100 Mbps or 10 Mbps. The building network infrastructure 202B services another building and includes building/floor routers 204C and 204C, switches/hubs 208C and 208D, and WAPs 206C and 206D.

The switches/hubs 208A-208D service a plurality of wired LAN clients, e.g., desktop computers, wired phones, and other wired LAN devices. The WAPs 206A-206D service wireless network clients, e.g., laptop computers, wireless terminals, but may also service other devices that cannot easily access a wired LAN plug, such as a desktop computer. The WAPs 206A-260D operate may operate according to a standardized communication protocol, e.g., IEEE 802.11(a), IEEE 802.11(b), IEEE 802.11(g), etc. In combination, these devices service most, if not all of the packet communications within the premises 100 of FIG. 1. Of course, the structure of FIG. 2 is an example only and an actual implementation would include substantially more equipment and more links.

At least one server 218 and at least one database 220 couple to the campus core router 200B and/or the campus core router 200A. The server 218 includes at least one network management server and at least one call management server. The network management server is used to manage many of the network components. However, while the database 220 the server 218 are shown to reside external to the campus core routers 200A, the components could also be located within a common housing and/or be implemented by the processing components of the campus core routers 200A.

The campus core routers 200A and 200B and/or the building/floor routers 204A, 204B, 204C and/or 204C support Wireless Access Point (WAP) management according to the present invention. The campus core routers 200A and 200B and/or the building/floor routers 204A, 204B, 204C and/or 204C are referred to as multi-layer switches further herein and the management operations that they perform are described further with reference to FIGS. 3 through 10. These operations are typically implemented in software but may be implemented partially in software and partially in hardware.

Figure 3:
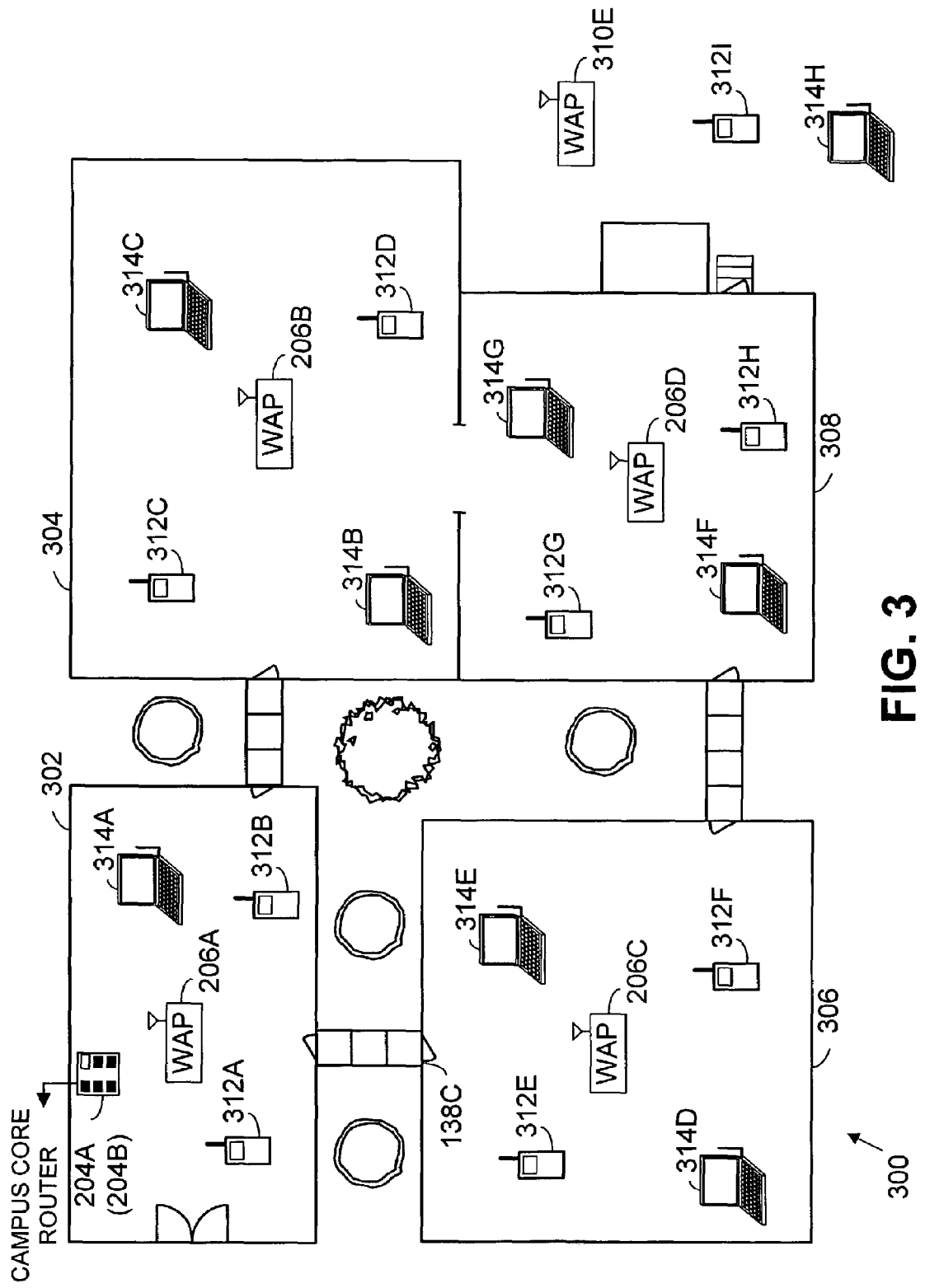
FIG. 3 is a partial system diagram illustrating a portion of a campus in which wireless communications are serviced according to the present invention.

FIG. 3 is a partial system diagram illustrating a portion of a campus in which wireless communications are serviced according to the present invention. A building floor 300 shown in FIG. 3 is part of the campus and may be a lower floor of one of the buildings of FIG. 1, e.g., building 102. The building floor 300 includes a plurality of rooms 302, 304, 306, and 308. Each of these rooms 302, 304, 306, and 308 includes a WAP 206A, 206B, 206C, and 206D, respectively, that services a corresponding area. Further, an external WAP 206E provides service external to room 308 of building floor 300. Each of these WAPs 206A-206E couples to a servicing building/floor router 204A or 204B via the wired LAN backbone. The servicing building/floor router 204A or 204B couples to the campus core router 200A (or 200B) as shown in FIG. 2.

Serviced within the building floor 300 are wireless terminals 312A-312I and laptop computers 314A-314H. Each of these devices wirelessly communicates with a servicing WAP. For example, laptop computer 314A and wireless terminals 312A and 312B wirelessly communicate with WAP 206A (in their illustrated positions). Each of the WAPs 206A-206D supports wireless communications primarily within a designated area, rooms 302-308, respectively. However, the coverage area of each WAP 206A-206D extends beyond the boundaries of its respective rooms 302-308 so that overlapping coverage areas exist. For example, WAPs 206A and 206C provide service between rooms 302 and 306 so that wireless terminals that roam between the rooms continue to receive wireless communication service when between the rooms 302 and 306. Further, WAP 206E supports wireless communications outside of the floor 300 to service laptop computer 314H and wireless terminal 312I. Note that the WAP placement of FIG. 3 is an example only and that each room may contain multiple WAPs or that a single WAP may cover multiple rooms.

Figure 4:
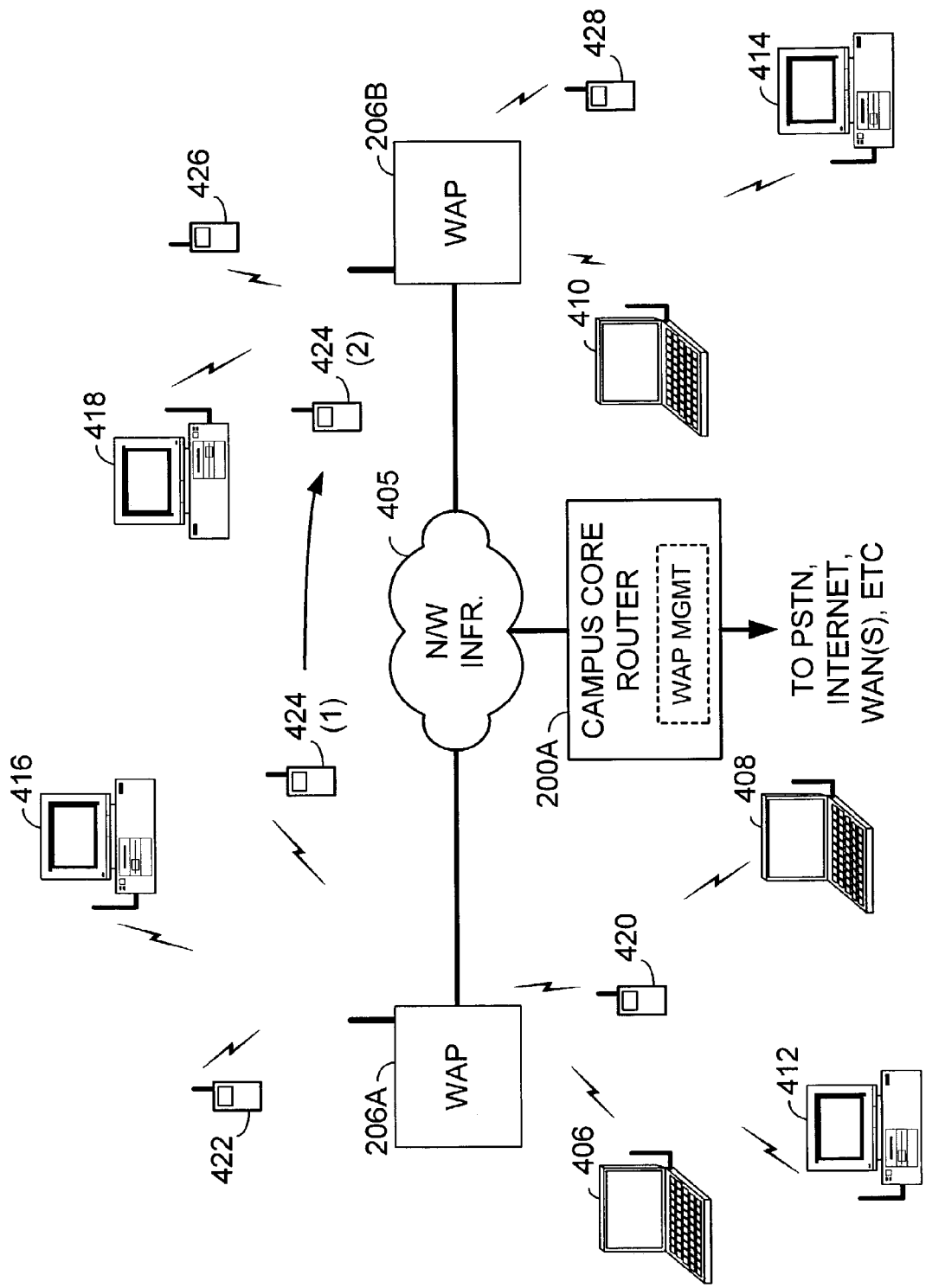
FIG. 4 is a block diagram partially illustrating a portion of a network of FIG. 3 that supports operations according to the present invention.

FIG. 4 is a block diagram partially illustrating a portion of a network of FIG. 3 that supports operations according to the present invention. The portion of the network shown includes WAPs 206A and 206B that support wireless communications within a jointly serviced area, for example, the rooms 302 and 304 of FIG. 3. The WAPs 206A and 206B couple to the network infrastructure 405, e.g., the network infrastructure shown in FIG. 2. The WAPs 206A and 206B service wireless communications for laptop computers 406, 408, and 410, desktop computers 412, 414, 416, and 418, and wireless terminals 420, 422, 422, 424, 426, and 428. The service coverage areas provided by WAPs 206A and 206B partially overlap. The network infrastructure 405 couples to one or more servicing multi-layer switches, e.g., campus core router 200A that includes WAP management functionality according to the present invention.

According to one aspect of the present invention, the operation of the plurality of WAPs 206A and 206B are partially managed by a core router, e.g., campus core router 200A, to ensure that the WAPs 206A and 206B provide sufficient bandwidth to service voice terminals, e.g., IEEE 802.11 phones, VOIP terminals, etc. According to one embodiment of these operations, the campus core router 200A downloads the identities of serviced voice terminals to the plurality of WAPs 206A and 206B. In servicing communications, the WAPs 206A and 206B recognize wireless terminals as voice terminals based upon their unique addresses/identifiers, e.g., wired LAN address. For wireless terminals that service only voice communications or for devices that have a unique address/identifier for voice service, this technique works fine. However, many devices service both voice communications and data communications.

Thus, according to another technique of the present invention, the campus core router 200A looks at the contents of serviced data packets to determine whether the communication is a voice communication. For example, layer 3 IP data packets carrying a voice communication may include an IP Precedence, DiffServ Code Point (DSCP), or 802.1p Class of Service field to indicate that the IP packet carries a voice communication. The campus core router 200A looks at the contents of the IP packet using this technique to determine whether the communication is a voice communication. However, wireless terminals may falsely indicate that a serviced packet data communication is a voice communication. Thus, according to another aspect of the present invention, the campus core router 200A investigates not only Layer 3 indications (which may falsely indicated Type of Service (ToS) as voice service) but must also investigate the Layer 4 socket number of the communication to determine whether the voice/data terminal is a voice communication. Nonetheless, some serviced wireless terminals may claim a voice Layer 4 TCP/UDP port number even though the communication is not a voice communication.

Thus, according to another operation of the present invention, communication characteristics are monitored by the campus core router 200A. For example, if a wireless terminal 420 has a sustained bandwidth usage of 64 Kbps or less, with fairly constant bandwidth usage, the communication is most likely a voice communication. Conversely, if the communication requires a large instantaneous bandwidth, e.g., 6 Mbps, and/or the communication is bursty, the communication is probably a data communication and not a voice communication. According to the present invention, a high processing capacity campus core router 200A monitors all communications and, based upon the characteristics of the communication, determines whether the communication is a voice communication.

Upon recognition of the terminal as a voice terminal servicing a voice communication, the campus core router 200A interacts with a servicing WAP, e.g., WAP 206A, to assign a Class of Service (CoS) to the voice communication that is sufficient to service the voice communication, e.g., CoS 5, as compared to the CoS that is assigned to data terminals, e.g., CoS 2. Such interaction directs the WAP to provide this CoS for the duration of the ongoing voice communication. However, upon termination of the voice communication, the serviced terminal will be provided with a default CoS, e.g., 2.

In an example of this operation, when wireless terminal 420 initiates a call, WAP 206A currently services laptop computers 406 and 408 as well as desktop computers 412 and 416. At this time, wireless terminals 422 and 424 are receiving short messages via WAP 206A. Each of these serviced devices consumes wireless bandwidth provided by the WAP 206A. However, the wireless terminal 420 requires low latency and guaranteed bandwidth for voice service. Thus, upon call initiation by the wireless terminal 420, or call termination to the wireless terminal 420, the campus core router 200A of the network infrastructure 405 identifies the communication as a packetized voice communication that is serviced by the WAP 206A. The campus core router 200A interacts with the WAP 206A to indicate to the WAP 206A that the communication is a voice communication. The WAP 206A (and/or the campus core router 200A) then assigns the wireless terminal 420 a CoS at a level that is sufficient for the WAP 206A to provide the wireless terminal 420 with sufficient wireless bandwidth to support the voice service. These operations will be described in detail with particular reference to FIGS. 8-10.

Figure 5:
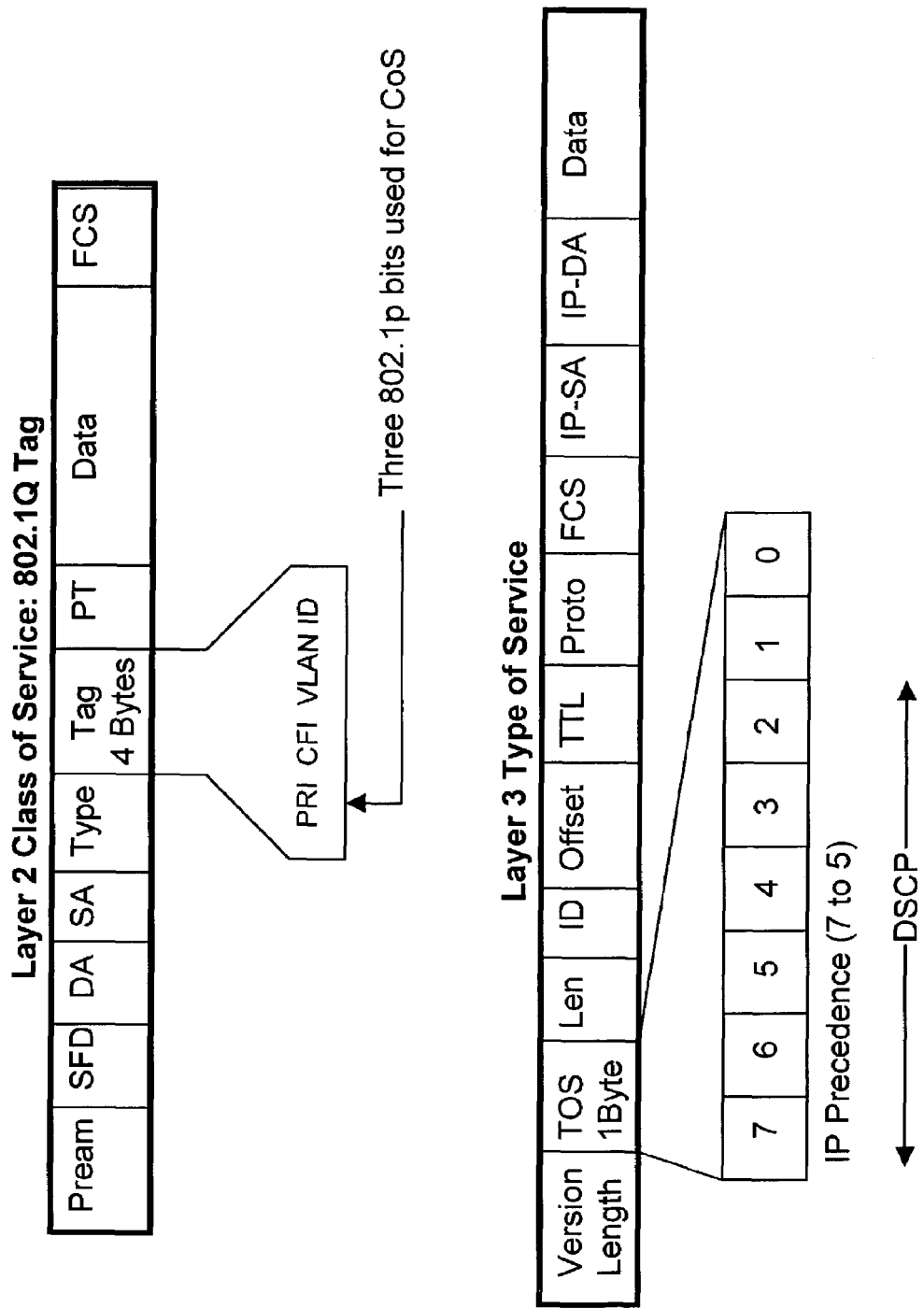
FIG. 5 is a block diagram illustrating two manners in which Class of Service information may be incorporated into data packets according to the present invention.

FIG. 5 is a block diagram illustrating two manners in which Class of Service (CoS) information may be incorporated into data packets according to the present invention. In one operation of the present invention, a multi-layer switch, e.g., campus core router 200A, monitors each serviced wireless communication to determine whether the communication is a voice communication. In making this determination, the campus core router 200A looks at the IP Precedence, DiffServ Code Point (DSCP), or 802.1p Class of Service field contained in an IP packet. If investigation of the IP packet indicates that the communication is a voice communication, (1) the campus core router 200A alters each Layer 2 packet to insert an appropriate CoS level, as shown for the Layer 2 packet; or (2) the campus core router 200A interacts with the servicing WAP such that the servicing WAP provides an appropriate level of wireless bandwidth to support the voice communication. In the second operation, the servicing WAP provides the appropriate level of wireless bandwidth without any alteration of Layer 2 packets.

Figure 6:
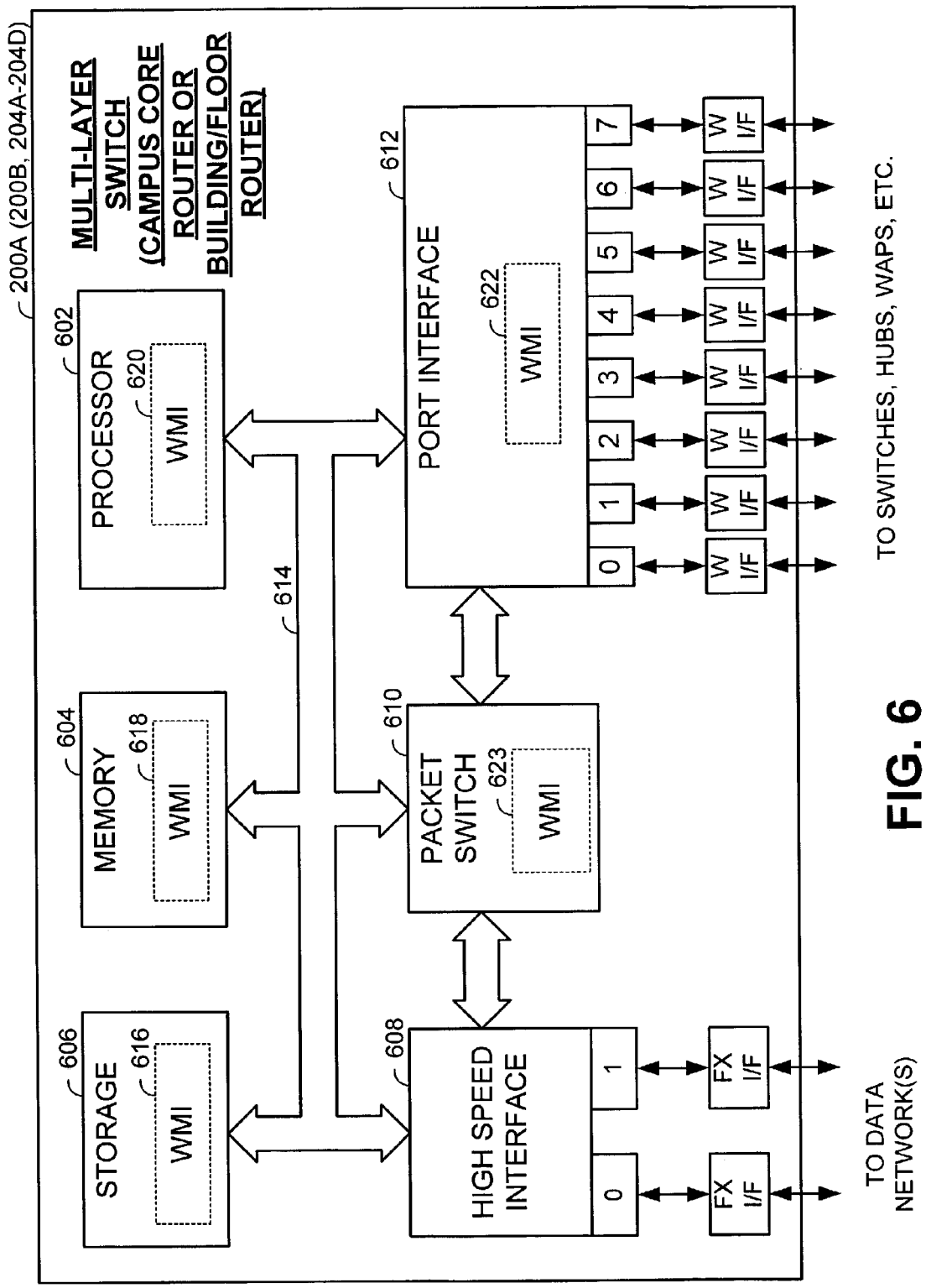
FIG. 6 is a block diagram illustrating a multi-layer switch constructed according to the present invention.

FIG. 6 is a block diagram illustrating a multi-layer switch, e.g., multi-layer switch 200A (or 200B) or building/floor router 204A-204D constructed according to the present invention. The structure illustrated in FIG. 6 is a diagrammatic representation of the structure of the multi-layer switch of FIG. 2 with minimal detail. As the reader will appreciate, other structures will support operation according to the present invention and the structure of FIG. 6 is only one example the structure of a multi-layer switch. The multi-layer switch 200A includes a processor 602, memory 604, storage 606, a high-speed interface 608, and a port interface 612, all of which couple via a system bus 614. Also contained within the multi-layer switch 200A is a packet switch 610 that couples to high-speed interface 608, port interface 612, and the system bus 614. The high-speed interface 608 either couples to a plurality of data networks or couples redundantly to a single data network. These interconnections are designated to be fiber interconnections. However, the interconnections could also be wired connections. With the structure of FIG. 2, for example, the high-speed interface 608 couples the multi-layer switch 200A to the gateway 214 and to the IWF 216. The port interface 612 includes eight ports and couples the multi-layer switch 200A to the wired network infrastructure of the LAN. Other embodiments of the port interface 612 of the multi-layer switch 200A may include a greater number, or a lesser number of ports.

In order to operate according to the present invention, the multi-layer switch 200A performs software and/or hardware operations. The instructions and operations that cause the multi-layer switch 200A to operate according to the present invention are referred to as WAP Management Instructions (WMI). When the WMI are implemented as software instructions, WMI are initially stored as WMI 616 in storage 606. The storage 606 may be an optical media, a hard drive, or other substantially static storage device. Memory 604 may include dynamic random access memory, read-only memory, or another type of memory that is known in the arts to facilitate the storage of instructions and data and that may be accessed by processor 602. Processor 602 may be a single microprocessor, multiple microprocessors, a processing module, or another processing device that is capable of executing software instructions and controlling the operation of other multi-layer switch 200A components coupled via system bus 614.

In executing the WMI 616, the WMI 616 are copied from storage 606 to memory 604 as WMI 618 and then read by the processor 602 from memory 604 as WMI 620. The execution of the WMI 620 by the processor 602 causes the processor to program/control the operation of the port interface 612 to operate according to the present invention. The processor 602 may then configure WMI 622 in the port interface 612 and/or WMI 623 in the packet switch 610. Such configuration may include programming routing tables with values and parameters. In combination, the WMI operations 620 performed by the processor, the WMI 622 performed by the port interface 612, and the WMI 623 performed by the packet switch enable the multi-layer switch 200A to operate according of the present invention.

Figure 7:
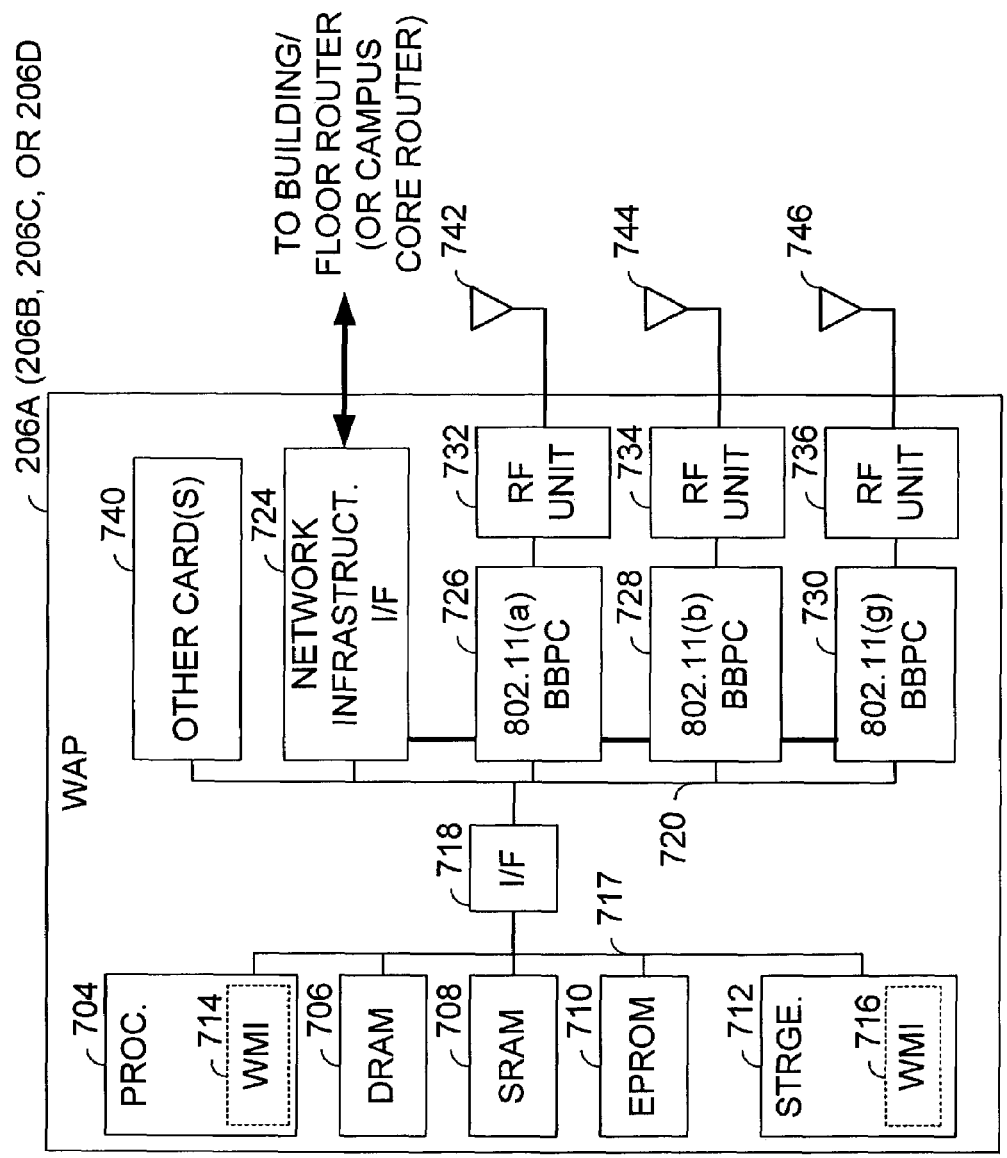
FIG. 7 is a block diagram illustrating a Wireless Access Point constructed according to the present invention.

FIG. 7 is a block diagram illustrating a Wireless Access Point (WAP) 106A, 106B, 106C, or 106D constructed according to the present invention. The WAP 106A includes a processor 704, dynamic RAM 706, static RAM 708, EPROM 710, and at least one data storage device 712, such as a hard drive, optical drive, tape drive, etc. These components (which may be contained on a peripheral processing card or module) intercouple via a local bus 717 and couple to a peripheral bus 720 via an interface 718.

Various peripheral cards couple to the peripheral bus 720. These peripheral cards include a network infrastructure interface card 724, which couples the WAP 103 to its servicing building/floor router (or core router). Baseband processing cards 726, 728 and 730 couple to Radio Frequency (RF) units 732, 734, and 736, respectively. Each of these baseband processing cards 726, 728, and 730 performs digital processing for a respective wireless communication protocol, e.g., 802.11(a), 802.11(b), and 802.11(g), serviced by the WAP 206A. The RF units 732, 734, and 736 couple to antennas 742, 744, and 746, respectively, and support wireless communication between the WAP 103 and wireless subscriber units. The WAP 103 may include other card(s) 740 as well. While the WAP 206A illustrated in FIG. 7 is shown to support three separate wireless communication protocols, other embodiments of the WAP 206A could support one, two, or more than three communication protocols.

The WAP 206A performs operations according to the present invention that are embodied at least partially as software instructions, i.e., WMI. WMI 714 enable the WAP 206A to perform the operations of the present invention. The WMI 716 are loaded into the storage unit 712 and some or all of the WMI 714 are loaded into the processor 704 for execution. During this process, some of the WMI 716 may be loaded into the DRAM 706.

Figure 8:
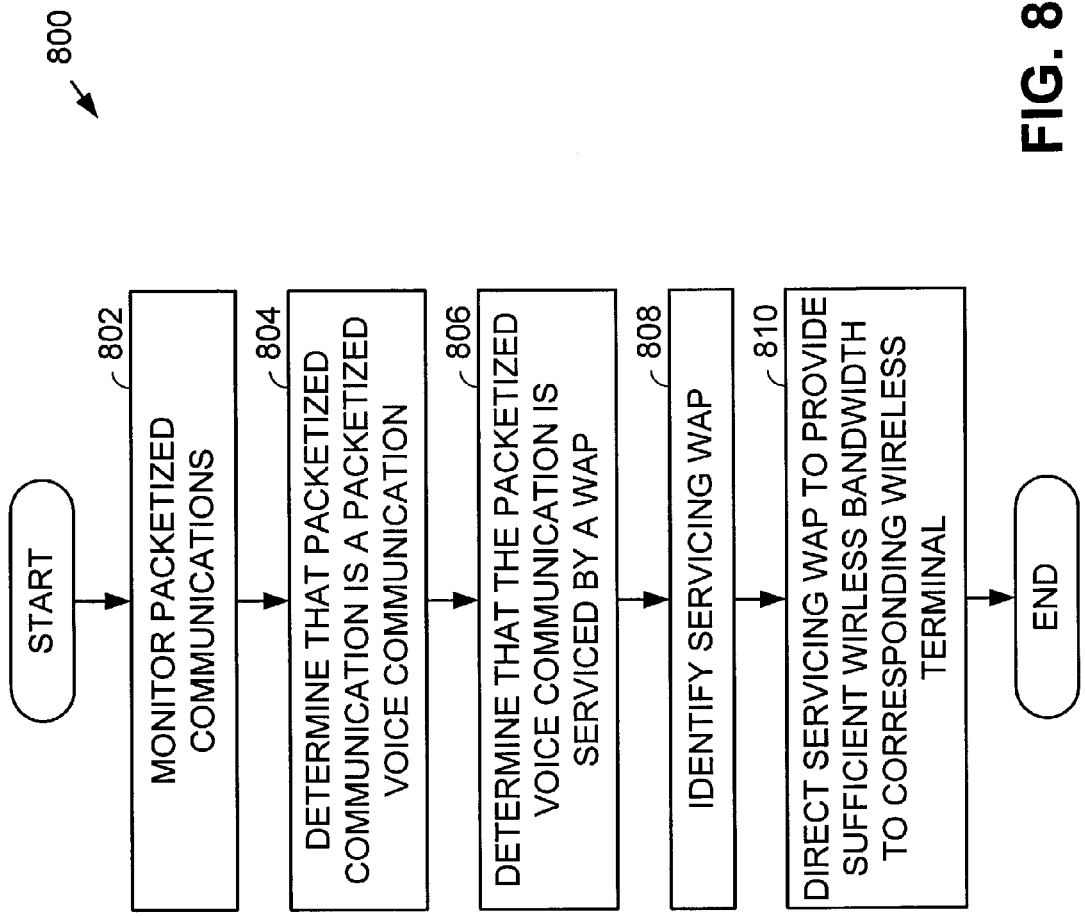
FIG. 8 is a logic diagram illustrating operation of the multi-layer switch of FIG. 6 according to the present invention.

FIG. 8 is a logic diagram illustrating operation of the multi-layer switch of FIG. 6 according to the present invention. With the operation of FIG. 8, a multi-layer switch of the wired network infrastructure supports operation of a plurality of WAPs and services packetized voice communications for at least one wireless terminal. In these operations, the multi-layer switch ensures that the WAPs provide sufficient bandwidth to wireless terminals that service the packetized voice communications to ensure adequate service. Because the multi-layer switch forms a portion of the wired LAN wired multi-layer switch also services a plurality of wired devices using only the wired network infrastructure of the LAN.

In ensuring that the WAPs provide sufficient bandwidth to wireless terminals that service the packetized voice communications to ensure adequate service, the multi-layer switch monitors a plurality of packetized communications serviced by the premises based network (step 802). The multi-layer switch then determines that a packetized communication of the plurality of packetized communications monitored is a packetized voice communication (step 804). Then the multi-layer switch determines that the packetized voice communication is wirelessly serviced by at least one of the plurality of WAPs (step 806). The multi-layer switch then identifies a servicing WAP of the plurality of WAPs that wirelessly services the packetized voice communication of the plurality of packetized communications (step 808). Finally, the multilayer switch directs the servicing WAP of the plurality of WAPs to provide sufficient wireless bandwidth to a wireless terminal corresponding to the packetized voice communication (step 810).

In directing the servicing WAP of the plurality of WAPs to provide sufficient wireless bandwidth to the wireless terminal corresponding to the packetized voice communication, the multi-layer switch may directs the WAP to provide a particular Class of Service (CoS) to the wireless terminal. Alternately, in directing the servicing WAP of the plurality of WAPs to provide sufficient wireless bandwidth to the wireless terminal corresponding to the packetized voice communication, the multi-layer switch may direct the WAP to provide a maximum packet transfer latency to the packetized voice communication serviced by the wireless terminal.

In directing the servicing WAP of the plurality of WAPs to provide sufficient wireless bandwidth to the wireless terminal corresponding to the packetized voice communication, the multi-layer switch may determine a current load on the servicing WAP. Then, based upon the current load, the multi-layer switch determines that the servicing WAP has insufficient wireless bandwidth to service the packetized voice communication. Finally, the multi-layer switch reduces usage of wireless resources of the servicing WAP by other wireless terminals so that the servicing WAP will have sufficient wireless bandwidth to service the packetized voice communication.

In reducing usage of wireless resources of the servicing WAP by other wireless terminals so that the servicing WAP will have sufficient wireless bandwidth to service the packetized voice communication, the multi-layer switch first identifies other packetized communications serviced by the servicing WAP. Then, the multi-layer switch alters the service level provided to these other packetized communications by the servicing WAP. Resultantly, resources are released that are used to service the packetized voice communication.

Alternately, in reducing usage of wireless resources of the servicing WAP by other wireless terminals so that the servicing WAP will have sufficient wireless bandwidth to service the packetized voice communication, the multi-layer switch may identify other packetized communications serviced by the servicing WAP. Then, the multi-layer switch introduces packet delay into the other packetized communications serviced by the servicing WAP. Resultantly, the upper protocol layers servicing the other packetized communications, e.g., TCP layer, will reduce their data application rate, e.g., bit rate. Resultantly, the other packetized communications will use fewer wireless resources of the servicing WAP.

Figure 9:
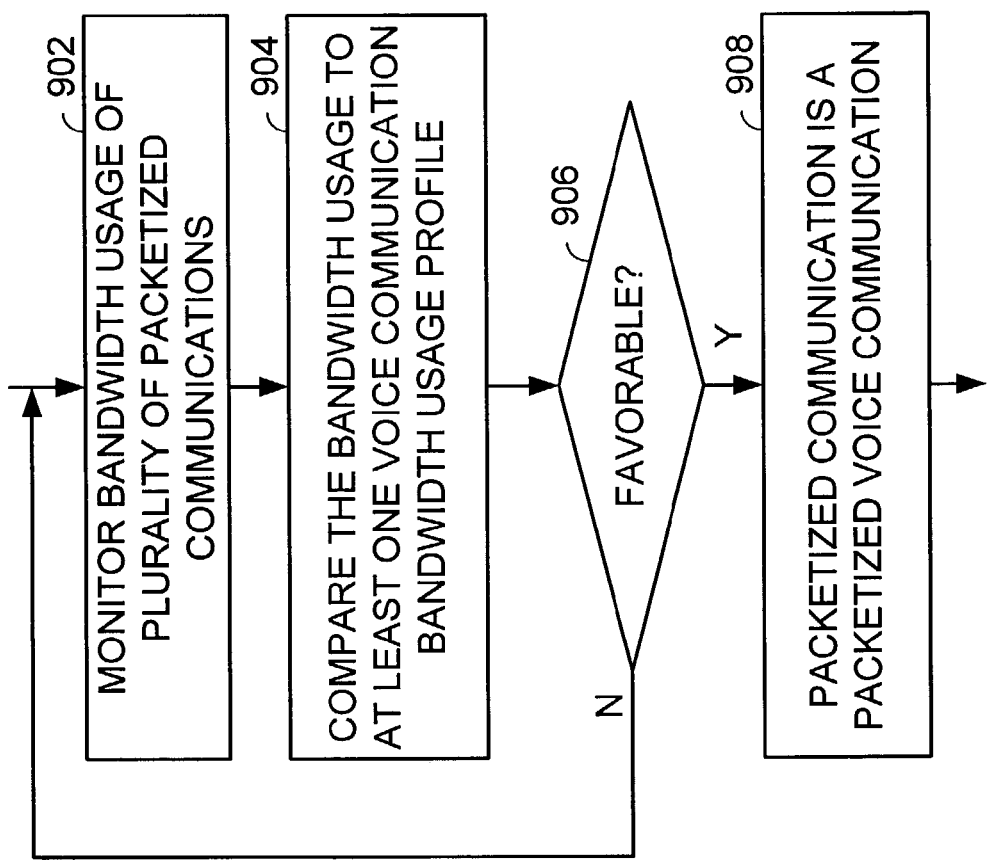
FIG. 9 is a logic diagram illustrating one embodiment of an operation of FIG. 8 in which the multi-layer switch of FIG. 6 determines that a serviced packetized communication is a packetized voice communication.

FIG. 9 is a logic diagram illustrating one embodiment of an operation of FIG. 8 in which the multi-layer switch of FIG. 6 determines that a serviced packetized communication is a packetized voice communication. In determining that the packetized communication of the plurality of packetized communications monitored by the multi-layer switch is a packetized voice communication, the multi-layer switch may monitor the bandwidth usage of the plurality of packetized communications (step 902). Then, the multi-layer switch compares the bandwidth usage of the plurality of packetized communications to at least one voice communication bandwidth usage profile (step 904). If the comparison is favorable (as determined at step 906), the multi-layer switch determines that one of the packetized communications is a packetized voice communication (step 908). If not, operation returns to step 902.

Figure 10:
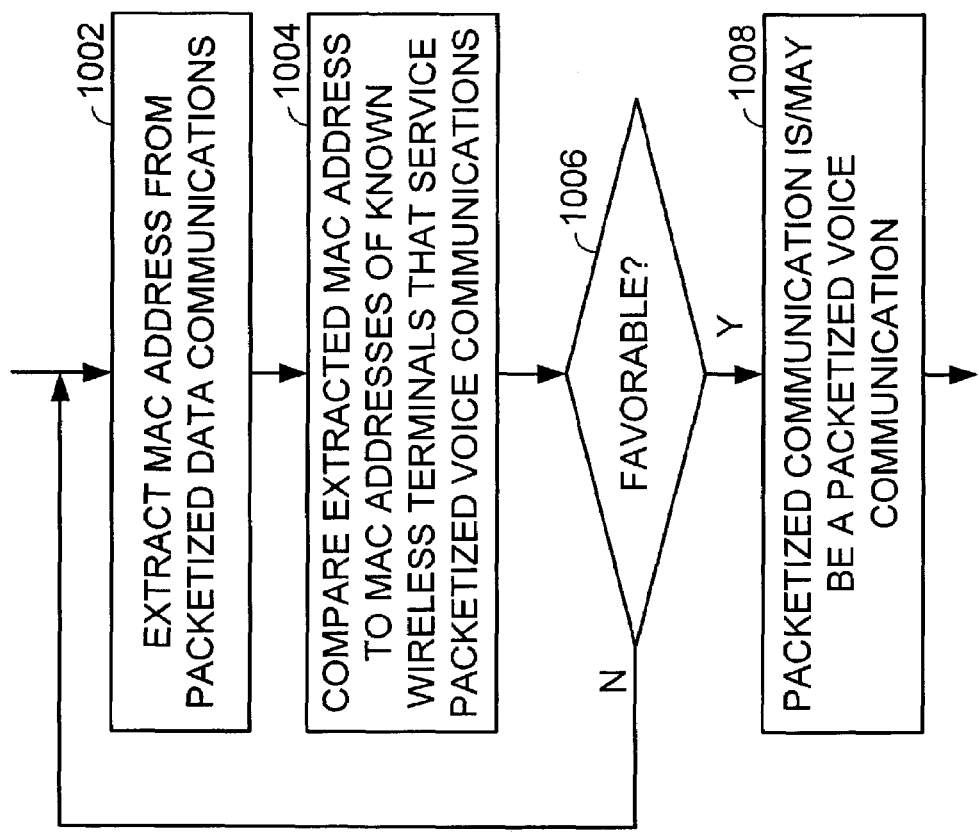
FIG. 10 is a logic diagram illustrating another embodiment of an operation of FIG. 8 in which the multi-layer switch of FIG. 6 determines that a serviced packetized communication is a packetized voice communication.

FIG. 10 is a logic diagram illustrating another embodiment of an operation of FIG. 8 in which the multi-layer switch of FIG. 6 determines that a serviced packetized communication is a packetized voice communication. In determining that the packetized communication of the plurality of packetized communications monitored by the multi-layer switch is a packetized voice communication, the multi-layer switch may extract a MAC address from a packetized communication of the plurality of packetized communications (step 1002). The multi-layer switch then compares the extracted MAC addresses to MAC addresses of known wireless terminals that service packetized voice communications (step 904). If the comparison is favorable (as determined at step 1006), the multi-layer switch then determines that the packetized communication is a packetized voice communication (step 1008). If not, operation returns to step 1002.

Instead of extracting MAC addresses (at steep 1002), the multi-layer switch may instead extract service level characteristics from a packetized communication of the plurality of packetized communications. Then, based upon the service level characteristics extracted from the packetized communication, the multi-layer switch then determines that the packetized communication is a packetized voice communication The invention disclosed herein is susceptible to various modifications and alternative forms. Specific embodiments therefore have been shown by way of example in the drawings and detailed description. It should be understood, however, that the drawings and description thereto are not intended to limit the invention to the particular form disclosed, but on the contrary, the invention is to cover all modifications, equivalents and alternatives falling within the spirit and scope of the present invention as defined by the claims.

The invention claimed is:

1. A method for servicing wireless packetized voice communications by a wired Local Area Network (wired LAN) and a plurality of Wireless Access Points (WAPs) coupled to a wired network infrastructure of the wired LAN, the method comprising:

wirelessly servicing, by at least one WAP of the plurality of WAPs and a multi-layer switch of the wired network infrastructure, packetized voice communications for at least one wireless terminal;

monitoring, by the multi-layer switch, a plurality of packetized communications serviced by the premises based network;

determining that a packetized communication of the plurality of packetized communications monitored by the multi-layer switch is a packetized voice communication;

determining that the packetized voice communication is wirelessly serviced by at least one of the plurality of WAPs;

identifying a servicing WAP of the plurality of WAPs that wirelessly services the packetized voice communication of the plurality of packetized communications; and directing the servicing WAP of the plurality of WAPs to provide sufficient wireless bandwidth to a wireless terminal corresponding to the packetized voice communication.

2. The method of claim 1, wherein in directing the servicing WAP of the plurality of WAPs to provide sufficient wireless bandwidth to the wireless terminal corresponding to the packetized voice communication, the multi-layer switch directs the WAP to provide a particular Class of Service (CoS) to the wireless terminal.

3. The method of claim 1, wherein in directing the servicing WAP of the plurality of WAPs to provide sufficient wireless bandwidth to the wireless terminal corresponding to the packetized voice communication, the multi-layer switch directs the WAP to provide a maximum packet transfer latency to the packetized voice communication serviced by the wireless terminal.

4. The method of claim 1, wherein in determining that the packetized communication of the plurality of packetized communications monitored by the multi-layer switch is a packetized voice communication, the method includes:

monitoring, by the multi-layer switch, the bandwidth usage of the plurality of packetized communications;

comparing, by the multi-layer switch, the bandwidth usage of the plurality of packetized communications to at least one voice communication bandwidth usage profile; and based upon the comparison performed by the multi-layer switch, determining, by the multi-layer switch, that one of the packetized communications is a packetized voice communication.

5. The method of claim 1, wherein in determining that the packetized communication of the plurality of packetized communications monitored by the multi-layer switch is a packetized voice communication, the method includes:

extracting, by the multi-layer switch, a MAC address from a packetized communication of the plurality of packetized communications;

comparing, by the multi-layer switch, the extracted MAC addresses to MAC addresses of known wireless terminals that service packetized voice communications; and based upon the comparison, determining that the packetized communication is a packetized voice communication.

6. The method of claim 1, wherein in determining that the packetized communication of the plurality of packetized communications monitored by the multi-layer switch is a packetized voice communication, the method includes:

extracting, by the multi-layer switch, a MAC address from a packetized communication of the plurality of packetized communications;

comparing, by the multi-layer switch, the extracted MAC addresses to MAC addresses of known wireless terminals that service packetized voice communications;

based upon the comparison, the multi-layer switch determining that a wireless terminal servicing the packetized communication is capable of servicing packetized voice communications;

monitoring, by the multi-layer switch, the bandwidth usage of the packetized communication of the plurality of packetized communications;

comparing, by the multi-layer switch, the bandwidth usage of the packetized communication to at least one voice communication bandwidth usage profile by the multi-layer switch; and based upon the comparison performed by the multi-layer switch, the multi-layer switch determining that the packetized communication is a packetized voice communication.

7. The method of claim 1, further comprising servicing a plurality of wired devices using only the wired network infrastructure of the LAN.

8. The method of claim 1, wherein in directing the servicing WAP of the plurality of WAPs to provide sufficient wireless bandwidth to the wireless terminal corresponding to the packetized voice communication, the method includes:

determining a current load on the servicing WAP;

based upon the current load, determining that the servicing WAP has insufficient wireless bandwidth to service the packetized voice communication; and reducing usage of wireless resources of the servicing WAP by other wireless terminals so that the servicing WAP will have sufficient wireless bandwidth to service the packetized voice communication.

9. The method of claim 8, wherein in reducing usage of wireless resources of the servicing WAP by other wireless terminals so that the servicing WAP will have sufficient wireless bandwidth to service the packetized voice communication, the method includes:

identifying, by the multi-layer switch, other packetized communications serviced by the servicing WAP; and altering, by the multi-layer switch, the service level provided to these other packetized communications by the servicing WAP.

10. The method of claim 8, wherein in reducing usage of wireless resources of the servicing WAP by other wireless terminals so that the servicing WAP will have sufficient wireless bandwidth to service the packetized voice communication, the method includes:

identifying, by the multi-layer switch, other packetized communications serviced by the servicing WAP; and introducing, by the multi-layer switch at the multi-layer switch, packet delay into the other packetized communications serviced by the servicing WAP so that upper protocol layer throughput will be reduced for the other packetized communications and, resultantly, the other packetized communications will use fewer wireless resources of the servicing WAP.

11. The method of claim 1, wherein in determining that the packetized communication of the plurality of packetized communications monitored by the multi-layer switch is a packetized voice communication, the method includes:

extracting, by the multi-layer switch, service level characteristics from a packetized communication of the plurality of packetized communications; and based upon the service level characteristics extracted from the packetized communication of the plurality of packetized communications, determining that the packetized communication is a packetized voice communication.

12. The method of claim 1, wherein directing the servicing WAP of the plurality of WAPs to provide sufficient wireless bandwidth to a wireless terminal corresponding to the packetized voice communication is performed by a network manager of the wired network infrastructure of the LAN.

13. A multi-layer switch that supports a wired Local Area Network (wired LAN) having a wired network infrastructure, the multi-layer switch comprising:

a high-speed packet data network interface that couples the multi-layer switch to a high-speed packet data network;

a port interface communicatively coupled to the high speed packet data network and to the wired network infrastructure, wherein the port interface further communicatively couples the multi-layer switch to a plurality of Wireless Access Points (WAPs) that couple to the wired network infrastructure; and a processor operably coupled to the port interface, wherein the processor executes a plurality of software instructions that, upon execution, cause the multi-layer switch to:

wirelessly service packetized voice communications for at least one wireless terminal;

monitor a plurality of packetized communications serviced by the premises based network;

determine that a packetized communication of the plurality of packetized communications is a packetized voice communication;

determine that the packetized voice communication is wirelessly serviced by at least one of the plurality of WAPs;

identify a servicing WAP of the plurality of WAPs that wirelessly services the packetized voice communication of the plurality of packetized communications; and direct the servicing WAP of the plurality of WAPs to provide sufficient wireless bandwidth to a wireless terminal corresponding to the packetized voice communication.

14. The multi-layer switch of claim 13, wherein in directing the servicing WAP of the plurality of WAPs to provide sufficient wireless bandwidth to the wireless terminal corresponding to the packetized voice communication, the processor executes software instructions to cause the multi-layer switch to direct the WAP to provide a particular Class of Service (CoS) to the wireless terminal.

15. The multi-layer switch of claim 13, wherein in directing the servicing WAP of the plurality of WAPs to provide sufficient wireless bandwidth to the wireless terminal corresponding to the packetized voice communication, the processor executes software instructions to cause the multi-layer switch to direct the WAP to provide a maximum packet transfer latency to the packetized voice communication serviced by the wireless terminal.

16. The multi-layer switch of claim 13, wherein in determining that the packetized communication of the plurality of packetized communications is a packetized voice communication, the processor executes software instructions to cause the multi-layer switch to:
 monitor the bandwidth usage of the plurality of packetized communications;
 compare the bandwidth usage of the plurality of packetized communications to at least one voice communication bandwidth usage profile; and
 based upon the comparison, determine that one of the packetized communications is a packetized voice communication.

17. The multi-layer switch of claim 13, wherein in determining that the packetized communication of the plurality of packetized communications is a packetized voice communication, the processor executes software instructions to cause the multi-layer switch to:
 extract a MAC address from a packetized communication of the plurality of packetized communications;
 compare the extracted MAC addresses to MAC addresses of known wireless terminals that service packetized voice communications; and
 based upon the comparison, determine that the packetized communication is a packetized voice communication.

18. The multi-layer switch of claim 13, wherein in determining that the packetized communication of the plurality of packetized communications monitored by the multi-layer switch is a packetized voice communication, the processor executes software instructions to cause the multi-layer switch to:
 extract a MAC address from a packetized communication of the plurality of packetized communications;
 compare the extracted MAC addresses to MAC addresses of known wireless terminals that service packetized voice communications;
 based upon the comparison, determine that a wireless terminal servicing the packetized communication is capable of servicing packetized voice communications;
 monitor the bandwidth usage of the packetized communication of the plurality of packetized communications;
 compare the bandwidth usage of the packetized communication to at least one voice communication bandwidth usage profile; and
 based upon the comparison, determine that the packetized communication is a packetized voice communication.

19. The multi-layer switch of claim 13, wherein in directing the servicing WAP of the plurality of WAPs to provide sufficient wireless bandwidth to the wireless terminal corresponding to the packetized voice communication, the processor executes software instructions to cause the multi-layer switch to:
 determine a current load on the servicing WAP;
 based upon the current load, determine that the servicing WAP has insufficient wireless bandwidth to service the packetized voice communication; and
 direct the servicing WAP to reduce usage of wireless resources of the by other wireless terminals so that the servicing WAP will have sufficient wireless bandwidth to service the packetized voice communication.

20. The multi-layer switch of claim 19, wherein in directing the servicing WAP to reduce usage of wireless resources of the by other wireless terminals so that the servicing WAP will have sufficient wireless bandwidth to service the packetized voice communication, the processor executes software instructions to cause the multi-layer switch to:
 identify other packetized communications serviced by the servicing WAP; and
 alter the service level provided to these other packetized communications by the servicing WAP.

21. The multi-layer switch of claim 19, wherein in directing the servicing WAP to reduce usage of wireless resources of the by other wireless terminals so that the servicing WAP will have sufficient wireless bandwidth to service the packetized voice communication, the processor executes software instructions to cause the multi-layer switch to:
 identify other packetized communications serviced by the servicing WAP; and
 introduce packet delay into the other packetized communications serviced by the servicing WAP so that upper protocol layer throughput will be reduced for the other packetized communications and, resultantly, the other packetized communications will use fewer wireless resources of the servicing WAP.

22. A multi-layer switch that supports a wired Local Area Network (wired LAN) having a wired network infrastructure and a plurality of Wireless Access Points (WAPs) coupled to the wired network infrastructure of the wired LAN, the multi-layer switch comprising:
 means for wirelessly servicing, by at least one WAP of the plurality of WAPs and a multi-layer switch of the wired network infrastructure, packetized voice communications for at least one wireless terminal;
 means for monitoring, by the multi-layer switch, a plurality of packetized communications serviced by the premises based network;
 means for determining that a packetized communication of the plurality of packetized communications monitored by the multi-layer switch is a packetized voice communication;
 means for determining that the packetized voice communication is wirelessly serviced by at least one of the plurality of WAPs;
 means for identifying a servicing WAP of the plurality of WAPs that wirelessly services the packetized voice communication of the plurality of packetized communications; and
 means for directing the servicing WAP of the plurality of WAPs to provide sufficient wireless bandwidth to a wireless terminal corresponding to the packetized voice communication.

23. The multi-layer switch of claim 22, wherein the means for directing the servicing WAP of the plurality of WAPs to provide sufficient wireless bandwidth to the wireless terminal corresponding to the packetized voice communication, further include means for directing the WAP to provide a particular Class of Service (CoS) to the wireless terminal.

24. The multi-layer switch of claim 22, wherein the means for directing the servicing WAP of the plurality of WAPs to provide sufficient wireless bandwidth to the wireless terminal corresponding to the packetized voice communication further include means for directing the WAP to provide a maximum packet transfer latency to the packetized voice communication serviced by the wireless terminal.

25. The multi-layer switch of claim 22, wherein the means for determining that the packetized communication of the plurality of packetized communications monitored by the multi-layer switch is a packetized voice communication further include:
- means for monitoring the bandwidth usage of the plurality of packetized communications;
- means for comparing the bandwidth usage of the plurality of packetized communications to at least one voice communication bandwidth usage profile; and
- means for determining, based upon the comparison, that one of the packetized communications is a packetized voice communication.

26. The multi-layer switch of claim 22, wherein the means for determining that the packetized communication of the plurality of packetized communications monitored by the multi-layer switch is a packetized voice communication further include:
- means for extracting a MAC address from a packetized communication of the plurality of packetized communications;
- means for comparing the extracted MAC addresses to MAC addresses of known wireless terminals that service packetized voice communications; and
- based upon the comparison, determining that the packetized communication is a packetized voice communication.

27. The multi-layer switch of claim 22, wherein the means for determining that the packetized communication of the plurality of packetized communications monitored by the multi-layer switch is a packetized voice communication further include:
- means for extracting a MAC address from a packetized communication of the plurality of packetized communications;
- means for comparing the extracted MAC addresses to MAC addresses of known wireless terminals that service packetized voice communications;
- means for determining, based upon the comparison, that a wireless terminal servicing the packetized communication is capable of servicing packetized voice communications;
- means for monitoring the bandwidth usage of the packetized communication of the plurality of packetized communications;
- means for comparing the bandwidth usage of the packetized communication to at least one voice communication bandwidth usage profile by the multi-layer switch; and
- means for determining, based upon the comparison, that the packetized communication is a packetized voice communication.

28. The multi-layer switch of claim 22, further comprising means for servicing a plurality of wired devices using only the wired network infrastructure of the LAN.

29. The multi-layer switch of claim 22, wherein the means for directing the servicing WAP of the plurality of WAPs to provide sufficient wireless bandwidth to the wireless terminal corresponding to the packetized voice communication further include:
- means for determining a current load on the servicing WAP;
- means for determining, based upon the current load, that the servicing WAP has insufficient wireless bandwidth to service the packetized voice communication; and
- means for reducing usage of wireless resources of the servicing WAP by other wireless terminals so that the servicing WAP will have sufficient wireless bandwidth to service the packetized voice communication.

30. The multi-layer switch of claim 29, wherein the means for reducing usage of wireless resources of the servicing WAP by other wireless terminals so that the servicing WAP will have sufficient wireless bandwidth to service the packetized voice communication further include:
- means for identifying other packetized communications serviced by the servicing WAP; and
- means for altering the service level provided to these other packetized communications by the servicing WAP.

31. The multi-layer switch of claim 29, wherein the means for reducing usage of wireless resources of the servicing WAP by other wireless terminals so that the servicing WAP will have sufficient wireless bandwidth to service the packetized voice communication further include:
- means for identifying other packetized communications serviced by the servicing WAP; and
- means for introducing packet delay into the other packetized communications serviced by the servicing WAP so that upper protocol layer throughput will be reduced for the other packetized communications and, resultantly, the other packetized communications will use fewer wireless resources of the servicing WAP.

32. The multi-layer switch of claim 22, wherein the means for determining that the packetized communication of the plurality of packetized communications monitored by the multi-layer switch is a packetized voice communication further include:
- means for extracting service level characteristics from a packetized communication of the plurality of packetized communications; and
- based upon the service level characteristics extracted from the packetized communication of the plurality of packetized communications, determining that the packetized communication is a packetized voice communication.

* * * * *